United States Patent [19]

Lerch

[11] Patent Number: 5,302,906
[45] Date of Patent: Apr. 12, 1994

[54] METHOD AND ARRANGEMENT FOR DETERMINING A LOAD ANGLE OF A GENERATOR WHICH IS CONNECTED TO AN ELECTRICAL SUPPLY NETWORK

[75] Inventor: Edwin Lerch, Poxdorf, Fed. Rep. of Germany

[73] Assignee: Siemens Aktiengesellschaft, Munich, Fed. Rep. of Germany

[21] Appl. No.: 927,298

[22] PCT Filed: Mar. 21, 1990

[86] PCT No.: PCT/DE90/00224
§ 371 Date: Sep. 21, 1992
§ 102(e) Date: Sep. 21, 1992

[87] PCT Pub. No.: WO91/15047
PCT Pub. Date: Oct. 3, 1991

[51] Int. Cl.⁵ .............................................. H02J 3/24
[52] U.S. Cl. ................................... 324/650; 323/207; 323/212; 322/20
[58] Field of Search .................... 322/20, 99; 323/207, 323/210, 211, 212; 324/76, 34, 650

[56] References Cited

U.S. PATENT DOCUMENTS

| | | | |
|---|---|---|---|
| 4,292,580 | 9/1981 | Ott et al. | 323/212 |
| 4,412,171 | 10/1983 | Kaufhold | 322/20 |
| 4,755,738 | 7/1988 | Shimamura et al. | 323/210 |
| 5,134,356 | 7/1992 | El-Sharkawi et al. | 323/211 |
| 5,187,427 | 2/1993 | Erdman | 323/207 |

FOREIGN PATENT DOCUMENTS 1230126 12/1966 Fed. Rep. of Germany.
2851871 6/1984 Fed. Rep. of Germany.

OTHER PUBLICATIONS

IEEE Transactions on Power Apparatus and Systems, vol. PAS99, No. 1, Feb. 1980, New York, US, pp. 256–267; J. Meisel: Transient Stability Augmentation Using a Hierarchical Control Structure.
IEEE Transactions on Power Apparatus and Systems, vol. 103, No. 2, Feb. 1984, New York, US, pp. 265–274; B. Ooi et al.: Co-ordination of Static Var Compensation With Long Distance Radialtransmission System for Damping Improvement.

Primary Examiner—Kenneth A. Wieder
Assistant Examiner—Christopher Tobin
Attorney, Agent, or Firm—Kenyon & Kenyon

[57] ABSTRACT

In an electrical supply network containing a generator, critical fluctuations in real power can occur. The load angle of the generator is representative of these fluctuations. The present invention provides a method which measures the real and reactive power flow, the current and the voltage on a line to the generator and feeds these measured values along with reactance values $Y_L$ and $Y_Q$ of the generator and line to a computing device. The computing device determines an output signal $\delta$ which represents the load angle of the generator and fluctuations in real power. The output signal $\delta$ is provided to an indicating device and/or a reactive power compensator.

9 Claims, 3 Drawing Sheets

METHOD AND ARRANGEMENT FOR DETERMINING A LOAD ANGLE OF A GENERATOR WHICH IS CONNECTED TO AN ELECTRICAL SUPPLY NETWORK

BACKGROUND OF THE INVENTION

In an electrical supply network containing generators, intermediate transient effects which lead to critical fluctuations in the real power can occur between the generators. To damp out this fluctuation in the real power, reactive power compensators are typically used. Reactive power compensators are also used to stabilize the voltage of the supply network. However, a measured variable providing information on the fluctuations in the real power is required to control such a reactive power compensator. Such a measured variable may be, for example, the load angle of a generator. However, this variable can be determined only indirectly from the generator itself. Therefore, other measured variables, for example, frequency signals, have been used to control the reactive power compensator. A circuit arrangement which uses frequency signals to control a reactive power compensator is disclosed in DE 2,851,871. However, even this measured variable is satisfactory only within limits, since the measured variable actually required is the frequency difference between the generator and the supply network, which once again cannot be measured directly.

DE AS 1,230,126 discloses a device which detects the load angle metrologically in the immediate or non-immediate vicinity of the generator using components which are dependent on the terminal voltage and terminal current. In this case, the synchronous reactance $X_d$ is predetermined. This device is concerned with regulating relatively slow static processes on site at the generator.

The present invention seeks to provide a method for determining the load angle of a generator in an electrical supply network from measured variables which are present locally on a line and a device for implementing that method.

SUMMARY OF THE INVENTION

The present invention achieves this by providing in a system including a generator connected to an electrical supply network via a line, a method including steps of:

a) detecting measured values of a current and a voltage at any desired location in the supply network;

b) feeding the measured values to at least one measure value transducer;

c) forming a voltage signal V, a real power flow signal P, and a reactive power flow signal Q;

d) reducing the supply network based on a complex configuration of the supply network to determine equivalent variables for the generator and line parallel reactance component $Y_Q$ and for the generator and line series reactance component $Y_L$;

e) feeding the signals Q, P, V, $Y_Q$ and $Y_L$ to a computing device;

f) solving the mathematical relationship for $\delta$:

$$\delta = -\tan^{-1} \frac{Im\left(V - \left(\frac{P-jQ}{V} - Y_Q V\right)Y_L^{-1}\right)}{Re\left(V - \left(\frac{P-jQ}{V} - Y_Q V\right)Y_L^{-1}\right)}$$

where Im denotes the imaginary part, Re denotes the real part and j denotes the complex operator, and $Y_Q$ and $Y_L$ are complex variables;

g) forming an output signal $\delta$ in the computing device; and h) passing the output signal $\delta$, which is used as an angular measure of the load angle of the generator or of the fluctuations in the real power, to an indicating device.

In this way, an output signal $\delta$ which provides sufficiently accurate information on the magnitude of the load angle is made available. In this case, the method can be implemented at any location in a supply network. The computing device provided to solve the mathematical relationships can be designed as a computer or as an analog circuit.

Considering the transient generator reactance $X_d'$ for the series reactance component $Y_L$ is advantageous. The transient fluctuations in real power, which are of particular interest, are preferably determined by detecting a phase difference between the location of the measurement and the generator e.m.f.

Feeding the output signal $\delta$, as a regulating variable, to the regulating device of the reactive power compensator, the reactive power compensator being connected to the line is advantageous since fluctuations in real power in the network are effectively damped. The method of the present invention is particularly simple since the reactive power compensator does not need any additional measured variables from the generator. The measured variables at the location of the connection to the reactive power compensator to the line are adequate, the location of the connection being used as a reference node.

An additional generator can also be connected via an additional line to the supply network. Output signals 67a and 67b are initially formed in the computing device for each generator, and a difference signal $\Delta\delta$ is formed therefrom. The difference signal $\Delta\delta$ is supplied to the regulating device as a regulating variable. In this way, the method of the present invention can also be used on multi-generator systems. Thus, damping out fluctuations between selected generators, in a deliberate manner becomes possible. At the same time, suitable selection criteria for the difference signal can also be used.

Feeding dynamic changes in the series or parallel reactance components $Y_L$ and $Y_Q$ to the computing device as additional control variables is preferable. In this way, considering changes in the supply network, for example as a result of switching operations or network disturbances, when determining the load angle is possible.

The present invention further provides a device for determining the load angle for fluctuations in the real power of a generator. The device includes:

a) sensors,
   connected to any location in the supply network, and
   adapted to detect measured values of the current and voltage;

b) a measured value transducer,
   adapted to form a voltage signal V, a real power flow signal P, and a reactive power flow signal Q;
c) measuring lines,
   connecting said sensors to said measured value transducer;
d) input elements,
   adapted to form a signal $Y_Q$ for the generator and line parallel reactance component and a signal $Y_L$ for the generator and line series reactance component;
e) further measuring lines;
f) a computing device,
   adapted to receive the signals Q, P, V, $Y_Q$ and $Y_L$ from said further measuring lines,
   adapted to solve the mathematical relationship for $\delta$:

$$\delta = -\tan^{-1} \frac{Im\left(V - \left(\frac{P-jQ}{V} - Y_Q V\right) Y_L^{-1}\right)}{Re\left(V - \left(\frac{P-jQ}{V} - Y_Q V\right) Y_L^{-1}\right)}$$

where In denotes the imaginary part, Re denotes the real part, and j denotes the complex operator, and $Y_Q$ and $Y_L$ are complex variables;
g) an output,
   adapted to carry the output signal of said computing device; and
h) an indicating device,
   adapted to receive said output.

This device is particularly suitable for use with reactive power compensators, by means of which particularly good results are achieved in damping out fluctuations in real power.

DETAILED DESCRIPTION

Figure 1:
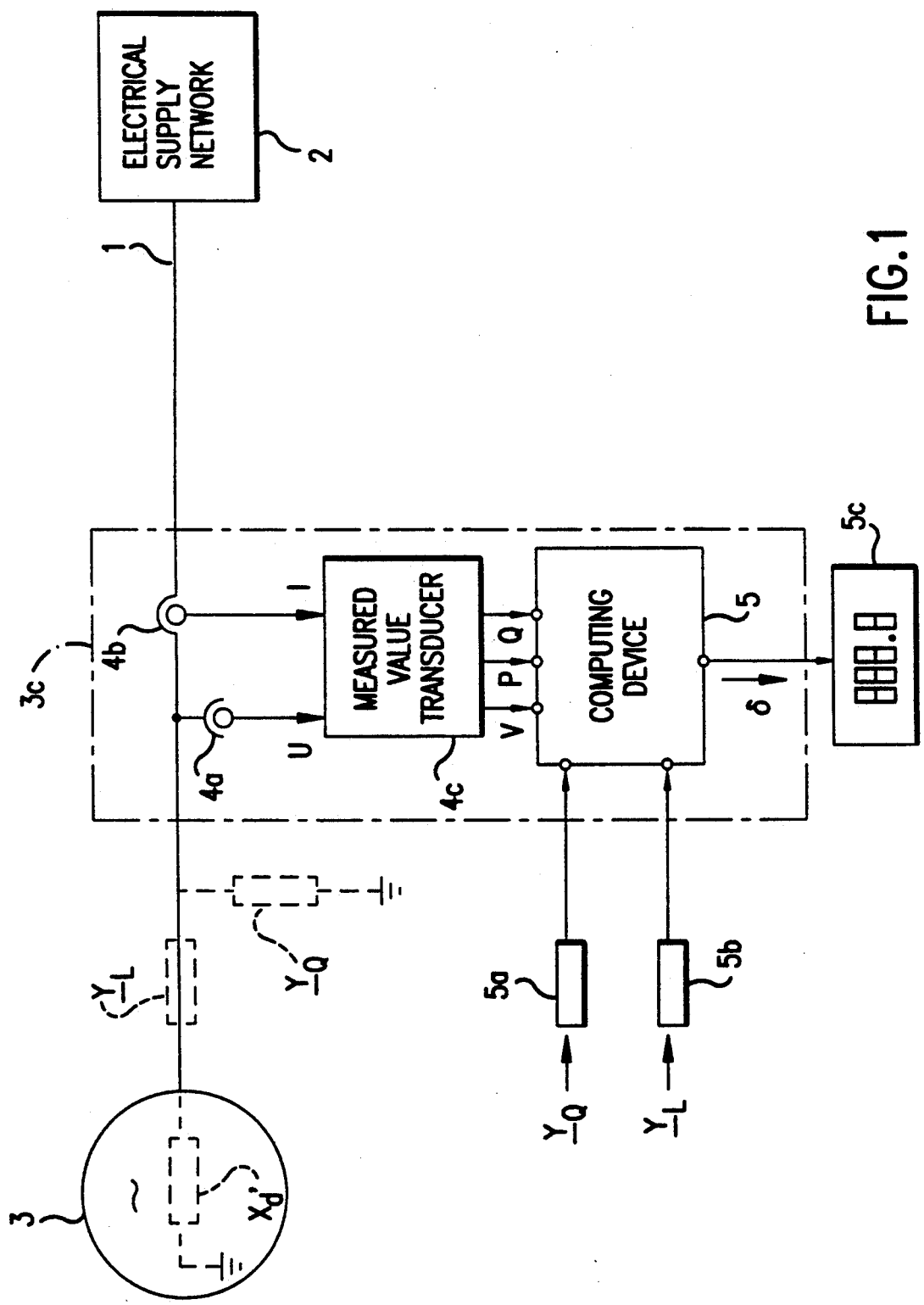
FIG. 1 is a schematic of a device, according to the present invention, for detecting the load angle in a supply network to which a generator is connected via a line.

In FIG. 1, a line 1 connects an electrical supply network 2 to a generator 3. Sensors 4a and 4b are arranged on the line 1 and detect measured values for a voltage U and a current I, respectively. An energy exchange takes place via the line 1 between the generator 3 and the supply network 2. If damping out fluctuations in real power is desired, information on the magnitude of the load angle of the generator 3 is needed. To obtain that magnitude, an arrangement 3c is provided in which the measured values U and I are fed to at least one measured value transducer 4c. This measured value transducer uses the input measured values to form a voltage signal V, a real power flow signal P, and a reactive power flow signal Q. In addition, a parallel reactance component $Y_Q$ of the generator and the line is provided at input element 5a, and a series reactance component $Y_L$ of the generator and the line is provided at input element 5b. In this case, $Y_Q$ and $Y_L$ represent equivalent variables. The signals Q, P, V, $Y_Q$ and $Y_L$ are subsequently fed to a computing device 5 to solve the mathematical relationship for $\delta$:

$$\delta = -\tan^{-1} \frac{Im\left(V - \left(\frac{P-jQ}{V} - Y_Q V\right) Y_L^{-1}\right)}{Re\left(V - \left(\frac{P-jQ}{V} - Y_Q V\right) Y_L^{-1}\right)}$$

Im denotes the imaginary part, Re denotes the real part and j denotes the complex operator. $Y_Q$ and $Y_L$ are complex variables. The term subtracted from V inside the bracket (i.e., $((P-jQ)/V) - Y_Q V$) may be regarded as the voltage across the transient machine reactance $X_{d'}$. Thus, accounting for the transient machine reactance $X_{d'}$ for $Y_L$ is preferable. An output signal $\delta$ is formed in the computing device 5 based on the aforementioned mathematical relationship. The output signal $\delta$ is used as an angular measure of the load angle or of the fluctuations in the real power of the generator 3. This signal is fed to an indicating device 5c. The output signal is particularly suitable for regulating a reactive power compensator since the fluctuation in the real power can be damped out in a deliberate manner.

Figure 2:
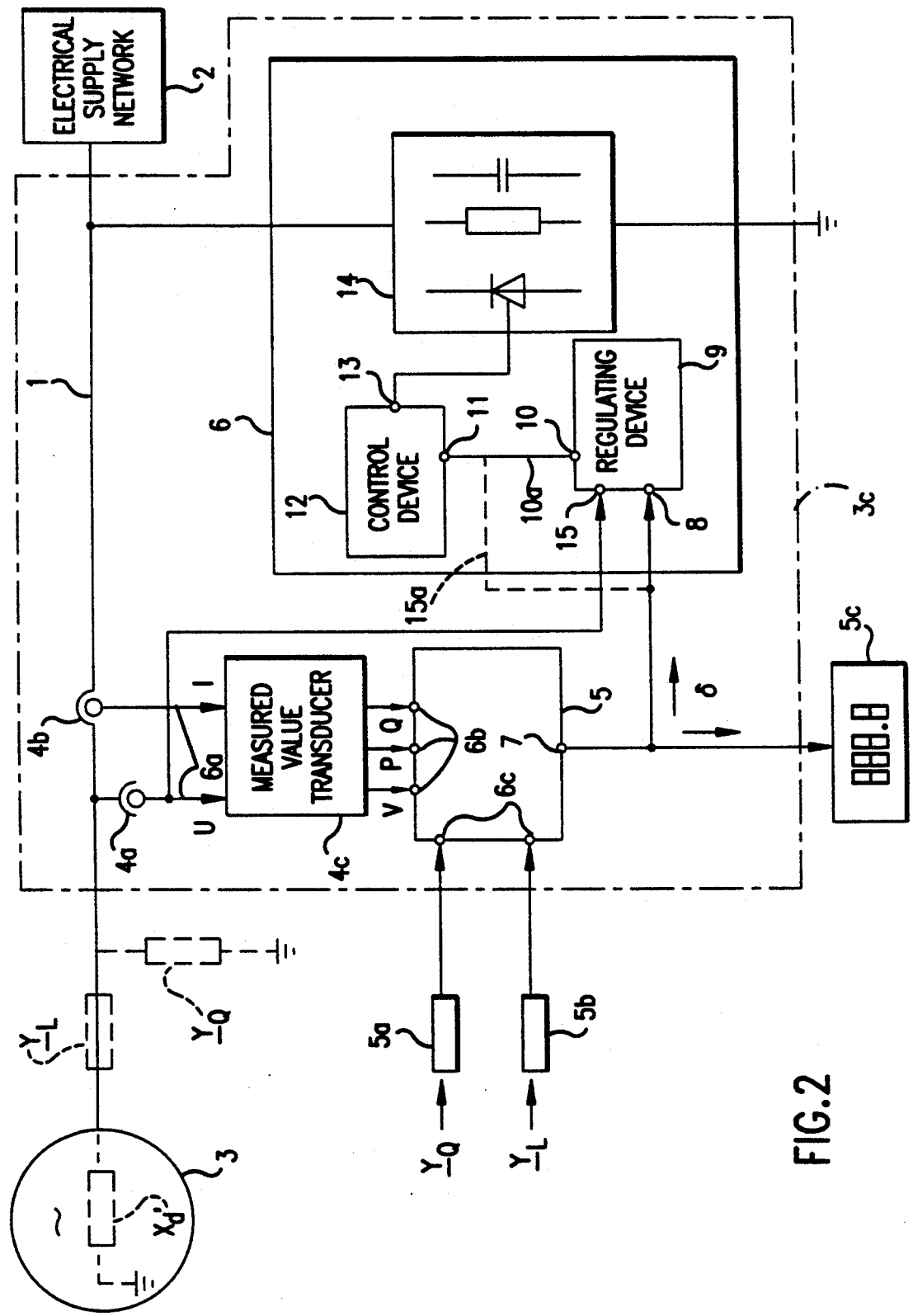
FIG. 2 is a schematic of a further exemplary embodiment of a device, according to the present invention, for detecting the load angle, which is connected to a reactive power compensator.

In FIG. 2, sensors 4a and 4b are again used to detect the voltage U and the current I of the line. The measured values from the sensors 4a and 4b are again fed to the measured value transducer 4c. The signals V, P and Q formed by the measured value transducer 4c are fed to inputs 6b of the computing device 5. The signals $Y_Q$ and $Y_L$ from input elements 5a, 5b are input, via further inputs 6c to the computing device 5. At the same time, dynamic changes in $Y_L$ and $Y_Q$ caused, for example, by switching operations or network changes, can also be input into the computing device 5. This can take place for example manually, or via special control and instrumentation devices.

An output 7 of the computing device 5 is connected to an input 8 of a regulating device 9 of a reactive power compensator 6. The output 10 of regulating device 9 is connected, via a line 10a, to an input 11 of a control device 12. The output 13 of the control device 12 is connected to the power section 14 of the reactive power compensator 6. The reactive power compensator 6 is connected to the line 1. The reactive power compensator 6 can normally be regulated as a function of voltage, for example. To this end, an input 15 of the regulating device 9 is connected to the sensor 4a which supplies the measured value U for voltage of the line. In this configuration, the voltage regulated reactive power compensator 6 can also use the output signal $\delta$ of the computing device 5 to damp out fluctuations in the reactive power.

Alternatively, the output signal $\delta$ of the computing devices can be connected to the input 11 of the control device 12 via line 15a (shown as a dashed line).

Figure 3:
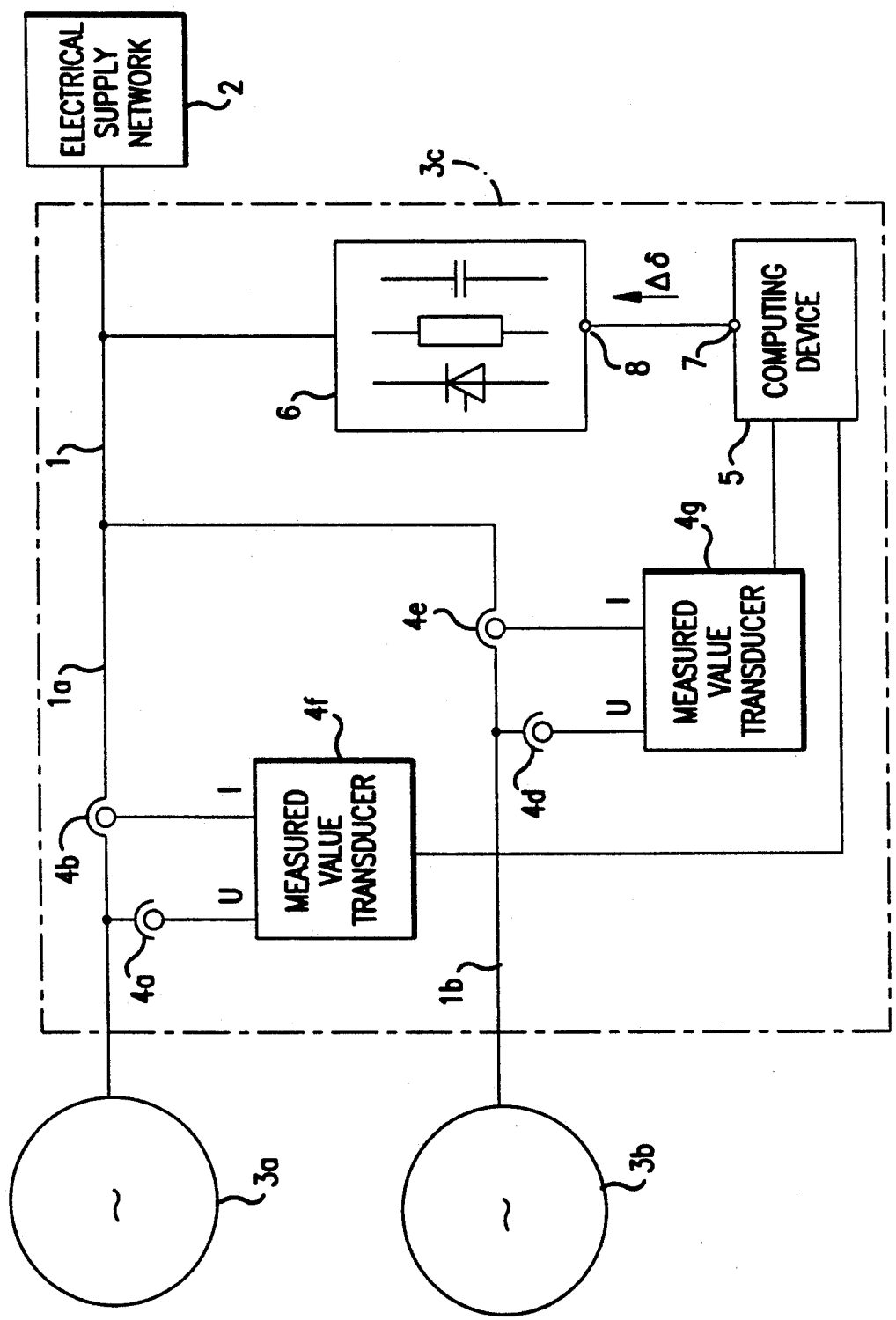
FIG. 3 is a schematic of an exemplary embodiment of the present invention in which two generators are connected to a supply network.

In FIG. 3, two generators 3a and 3b are connected to the supply network 2 via lines 1a and 1b, respectively. In this case, measured values for the current and voltage are detected via sensors 4a, 4b, 4d and 4e, respectively, for both generators 3a and 3b, and are fed to separate measured value transducers 4f and 4g, respectively. The signals V, P and Q formed in the measured value transducers 4f and 4g for generators 3a and 3d, respectively, are fed in each case separately to the computing device 5. Output signals δa and δb for generators 3a and 3b, respectively, are initially formed in the computing device 5. A difference signal Δδ is then formed therefrom. This difference signal Δδ is then used as a regulating variable for the reactive power compensator 6. The difference signal is fed from the output 7 of the computing device 5, to the input 8 of the reactive power compensator 6.

Using the present invention, the load angle difference between individual generators in a supply network 2 having a plurality of generators 3a, 3b can be determined. If necessary, in the case of a complex configuration, the network can initially be reduced to a two-generator system. The values for the generator and line parallel reactance component $Y_Q$ and for the generator and line series reactance component $Y_L$ are normally known from the network data and can be predetermined by a person skilled in the art.

The device of the present invention can also be advantageously used in other regulating devices in supply networks, particularly in three-phase networks.

I claim:

1. A method for controlling fluctuations in real power in an electrical supply network, which includes a generator coupled to the electrical supply network via a line, the method comprising the steps of:
   a) detecting measured values of current and voltage at any desired location within the electrical supply network;
   b) providing the measured values to a measured value transducer;
   c) forming a voltage signal V, a real power flow signal P, and a reactive power flow signal Q in said measured value transducer;
   d) performing a reduction of the electrical supply network to determine equivalent variables for the generator and line parallel reactance component $Y_Q$ and for the generator and line series reactance component $Y_L$;
   e) providing the signals Q, P, V, $Y_Q$ and $Y_L$ to a computing device;
   f) determining an angular measure δ of a load angle of the generator according to the following equation:

$$\delta = -\tan^{-1}\left\{ \frac{Im\left(V - \left(\frac{P - jQ}{V} - Y_Q V\right)Y_L^{-1}\right)}{Re\left(V - \left(\frac{P - jQ}{V} - Y_Q V\right)Y_L^{-1}\right)} \right\}$$

where Im denotes an imaginary part, Re denotes a real part and j denotes a complex operator, and $Y_Q$ and $Y_L$ are complex variables;
   g) providing the angular measure of the load angle δ to a reactive power compensator; and
   h) controlling the real power in the electrical supply network with a reactive power compensator by using the angular measure of the load angle δ as a controlled variable in the reactive power compensator.

2. A method for controlling fluctuations in real power in an electrical supply network, which includes a generator coupled to the electrical supply network via a line, the method comprising the steps of:
   a) detecting measured values of current and voltage in the electrical supply network;
   b) providing the measured values to a measured value transducer;
   c) forming a voltage signal V, a real power flow signal P, and a reactive power flow signal Q in said measured value transducer;
   d) performing a reduction of the electrical power network to determine equivalent variables for the generator and line parallel reactance component $Y_Q$ and for the generator and line series reactance component $Y_L$;
   e) providing the signals Q, P, V, $Y_Q$ and $Y_L$ to a computing device;
   f) determining an angular measure δ of the fluctuations in the real power δ of the generator according to the following equation:

$$\delta = -\tan^{-1}\left\{ \frac{Im\left(V - \left(\frac{P - jQ}{V} - Y_Q V\right)Y_L^{-1}\right)}{Re\left(V - \left(\frac{P - jQ}{V} - Y_Q V\right)Y_L^{-1}\right)} \right\}$$

where Im denotes an imaginary part, Re denotes a real part and j denotes a complex operator, and $Y_Q$ and $Y_L$ are complex variables;
   g) providing the angular measure δ of the fluctuations in the real power to a control device of a reactive power compensator; and
   h) regulating the fluctuations in the real power with the reactive power compensator by using the angular measure δ of the fluctuations in the real power as a controlled variable in the control device.

3. The method according to claim 1, wherein the electrical supply network has more than two generators coupled to it, further comprising the steps of:
   i) reducing the electrical supply network to a two generator system to determine $Y_Q$ and $Y_L$.

4. The method according to claim 2, wherein the electrical supply network has more than two generators coupled to it, further comprising the step of:
   i) reducing the electrical supply network to a two generator system to determine $Y_Q$ and $Y_L$.

5. A method for controlling the real power in an electrical supply network, which includes two generators coupled to the electrical supply network via two lines, the method comprising the steps of:
   a) detecting measured values of current and voltage at any desired location in the electrical supply network for each generator;
   b) providing the measured values for each generator to a measured value transducer;
   c) forming a voltage signal V, a real power flow signal P, and a reactive power flow signal Q for each generator in the measure value transducer;
   d) reducing the electrical supply network to determine for each generator equivalent variables for the generator and line parallel reactance component $Y_Q$ and for the generator and line series reactance component $Y_L$;
   e) providing the signals Q, P, V, $Y_Q$ and $Y_L$ for each generator to a computing device;
   f) determining a load angle $\delta_a$, $\delta_b$ of each generator according to the following equation:

$$\delta = -\tan^{-1}\left\{ \frac{Im\left(V - \left(\frac{P - jQ}{V} - Y_Q V\right)Y_L^{-1}\right)}{Re\left(V - \left(\frac{P - jQ}{V} - Y_Q V\right)Y_L^{-1}\right)} \right\}$$

where Im denotes an imaginary part, Re denotes a real part and j denotes a complex operator, and $Y_Q$ and $Y_L$ are complex variables;

g) forming a difference signal $\Delta\delta$ which represents a difference between the load angles $\delta_a$, $\delta_b$ of the two generators;

h) providing the difference signal $\Delta\delta$ as a controlled variable to a control device of a reactive power compensator; and i) regulating the real power in the electrical supply network with the reactive power compensator to damp out fluctuations in the real power, whereby $\Delta\delta$ represents a difference in the angular measure of the load angles of the generators or a difference in fluctuations in the real power of the generators.

6. A device for controlling fluctuations in real power of a generator coupled to an electrical supply network via a line, the device comprising:

a) a plurality of sensors being coupled to the electrical supply network and detecting measured values of current and voltage in the line;

b) a measured value transducer being coupled to the plurality of sensors and forming a voltage signal V, a real power flow signal P, and a reactive power flow signal Q;

c) a plurality of input elements being coupled to the measured value transducer, forming a signal $Y_Q$ for the generator and line parallel reactance component, and forming a signal $Y_L$ for the generator and line series reactance component;

d) a computing device being coupled to the plurality of input elements, receiving the signals V, P, Q, $Y_Q$ and $Y_L$ and determining the load angle $\delta$ of the generator according to the following equation:

$$\delta = -\tan^{-1}\left\{ \frac{Im\left(V - \left(\frac{P - jQ}{V} - Y_Q V\right)Y_L^{-1}\right)}{Re\left(V - \left(\frac{P - jQ}{V} - Y_Q V\right)Y_L^{-1}\right)} \right\}$$

where Im denotes an imaginary part, Re denotes a real part and j denotes a complex operator, and $Y_Q$ and $Y_L$ are complex variables; and e) a reactive power compensator being coupled to the computing device, and regulating the fluctuations in the real power in the generator using the load angle $\delta$ as a controlled variable.

7. A device for controlling real power fluctuations in a generator coupled to an electrical supply network via a line comprising:

a) a plurality of sensors being coupled to the electrical supply network, and detecting measured values of current and voltage;

b) a measured value transducer forming a voltage signal V, a real power flow signal P, and a reactive power flow signal Q;

c) a plurality of input elements forming a signal $Y_Q$ for the generator and line parallel reactance component and a signal $Y_L$ for the generator and line series reactance component;

d) a computing device receiving the signals Q, P, V, $Y_Q$ and $Y_L$ from said of plurality of input elements and determining a load angle $\delta$ of the generator according to the following equation;

$$\delta = -\tan^{-1}\left\{ \frac{Im\left(V - \left(\frac{P - jQ}{V} - Y_Q V\right)Y_L^{-1}\right)}{Re\left(V - \left(\frac{P - jQ}{V} - Y_Q V\right)Y_L^{-1}\right)} \right\}$$

where Im denotes an imaginary part, Re denotes a real part and j denotes a complex operator, and $Y_Q$ and $Y_L$ are complex variables; and g) a reactive power compensator having a control device being coupled to the computing device, receiving the load angle as a controlled variable, controlling the real power in the generator to damp out fluctuation in the real power.

8. The device according to claim 7 further comprising an indicating device being coupled to the computing device and receiving the load angle from said computing device.

9. A device for controlling real power fluctuations in two generators, the first of which is coupled to an electrical supply network via a first line and the second of which is coupled to the electrical supply network via a second line, the device comprising:

a) a first plurality of sensors being coupled to the electrical supply network via the first line, and detecting measured values of current and voltage in the first line;

b) a second plurality of sensors being coupled to electrical supply network via the second line, and detecting measured values of current and voltage in the second line;

c) a first measured value transducer forming a first voltage signal V, a first real power flow signal P, and a first reactive power flow signal Q for the first generator;

d) a second measured value transducer forming a second voltage signal V, a second real power flow signal P, and a second reactive power flow signal Q for the second generator;

e) a first plurality of input elements forming a first signal $Y_Q$ for the first generator and line parallel reactance component and a first signal $Y_L$ for the first generator and line series reactance component;

f) a second plurality of input elements forming a second signal $Y_Q$ for the second generator and line parallel reactance component and a second signal $Y_L$ for the second generator and line series reactance component;

g) a computing device receiving the first and second signals Q, P, V, $Y_Q$ and $Y_L$ from said first and second plurality of input elements, respectively, and determining a first load angle $\delta_a$ of the first generator and a second load angle $\delta_b$ of the second generator according to the following equation;

$$\delta = -\tan^{-1}\left\{\frac{Im\left(V - \left(\frac{P - jQ}{V} - Y_Q V\right)Y_L^{-1}\right)}{Re\left(V - \left(\frac{P - jQ}{V} - Y_Q V\right)Y_L^{-1}\right)}\right\}$$

where Im denotes an imaginary part, Re denotes a real part and j denotes a complex operator, and $Y_Q$ and $Y_L$ are complex variables, and outputting a difference between the first and second load angles $\delta_a, \delta_b$; and g) a reactive power compensator having a control device being coupled to the computing device, receiving the difference between the first and second load angles as a controlled variable, controlling the real power in the first and second generators to damp out fluctuations in the real power.

* * * * *